GÉRARD SIRE,
INVENTOR
By: Stephen W. Frishauf
Atty.

United States Patent Office 3,517,317
Patented June 23, 1970

3,517,317

MULTI-SOURCE SIGNAL COUPLING SYSTEM USING HYBRID JUNCTIONS TO COMPENSATE FOR SOURCE AMPLITUDE UNBALANCE

Gérard Sire, 7 Rue Leon L'Hermitte, Paris 15eme, France

Filed Apr. 25, 1967, Ser. No. 633,460
Claims priority, application France, May 2, 1966, 59,864
Int. Cl. H04b 1/04
U.S. Cl. 325—128 13 Claims

ABSTRACT OF THE DISCLOSURE

For coupling the two synchronous signal sources such as television transmitters (1,2) to a common utilization device, e.g. antenna (3), the sources are connected to the inputs of a first hybrid junction (10) whose outputs are connected to the inputs of another hybrid junction (15) having the utilization device (3) connected to one of its outputs and a dummy load (9) connected to its other output. A variable phase shifter (20) is interposed in one of the hybrid-interconnecting lines whereby the feed of power to the utilization device can be maximized even in case of an unbalance between the signal amplitudes produced by the sources, as in case of failure of one of the transmitters. Reference is made to FIG. 1.

CROSS REFERENCES TO RELATED APPLICATIONS

This U.S. application is based under International Convention on French patent application 59,864 filed May 2, 1966. Reference is also made in the disclosure to French Pat. No. 1,461,550 filed Oct. 22, 1965 by the assignee company and having the present applicant as one of the co-inventors.

BACKGROUND OF THE INVENTION

This invention relates to means for coupling two or more signal sources to a common output or utilization device. One important use of the invention resides in the coupling of a plurality of synchronized sources of radio energy, particularly television transmitters, to a common transmission antenna.

It is in many cases advantageous to feed a common transmission antenna with the combined energy from two or more transmitters producing similar, synchronized signals rather than using a single transmitter having a power rating equal to the combined power rating of such separate transmitters. The chief advantage is that the probability of complete failure of such a multi-source system is considerably less than that of a single-source system. Should one (or more) of the several transmitters of a multisource system fail, transmission can still continue under somewhat reduced power by feeding the antenna with the signals from the transmitter or transmitter remaining in operation.

For the indicated purpose it is known to use a hybrid ring or junction, e.g. of the type sometimes known as a "rat-race," having four input-output terminals serially interconnected in a ring by means of four waveguides or coaxial-line branches. The effective electrical lengths of the branches are usually selected so that three of the branches each equal one quarter wavelength of the average signal energy to be transmitted while the fourth branch equals three quarters said wavelength. A pair of signal transmitters are connected to two inputs across one diagonal of the hybrid junction, while the common antenna and a dummy load are respectively connected to the two outputs across the remaining diagonal of the hybrid. With such an arrangement, the signal energy from the two transmitters will combine vectorially so as to reach the antenna-terminal of the hybrid in cophasal relation and the opposite, dummy-load terminal of the hybrid in phase opposition, whereby all of the energy will normally be radiated from the antenna and none will be lost to the load.

With such a coupling arrangement, should one of the two transmitters fail the power output from the remaining transmitter will be shared equally between the antenna and the dummy load, so that the total radiated power will then be only one fourth the power radiated in normal operation as can readily be shown by vector analysis. In order that the full available power from the transmitter remaining in operation shall be fed to the antenna, it is necessary in the event of failure of one transmitter to connect the remaining transmitter directly to the antenna, and this necessarily involves a switching action which momentarily interrupts transmission. Such a break in transmission, even of very short duration, may be objectionable under many circumstances, such as in the transmission of visual information from the image transmitter of a television system since it will result in a comparatively long and very perceptible break in image reception.

It is an object of this invention to provide an improved arrangement for coupling a pair of signal sources, e.g. television transmitters, to a common utilization device, e.g. antenna, whereby a failure of one of the sources can be corrected and all of the signal energy available from the remaining operative source can be redirected to the utilization device, by a progressive action which will not involve even a momentary interruption in signal transmission. A further object is to produce such a correcting action automatically.

Further, even in the absence of a complete failure of one of the transmitters, the correct operation of a multi-source coupling system of the general class described herein, requires that the separate signal sources be continuously maintained in precise synchronism as to frequency and phase, and precise balance as to their output amplitude. Even a small discrepancy in the synchronism and/or amplitude output of the sources disturbs the proper vectorial addition of the signal energies and results in an appreciable drop in the total power fed to the utilization device. In the assignees' French Pat. No. 1,461,550 filed Oct. 22, 1965, means are disclosed for maintaining the requisite accurate frequency and phase synchronism between the sources. However, to the best of applicant's knowledge, no simple and convenient means have been available in the prior art for completely eliminating variations in the relative output amplitudes of the sources, as may be due to short-term and long-term differential variations in circuit characteristics between the sources, and other causes. This has resulted in very noticeable and objectionable fluctuations in the radiated power.

An object of this invention is to provide an improved multi-source coupling arrangement wherein the correct, optimal distribution of power fed from the respective sources to the common utilization device, e.g. transmission antenna, can be easily and, if desired, automatically maintained regardless of any variations in the relative output amplitudes of the sources.

Further objects are to provide improved lay-outs for multi-source television transmission system, wherein separate, synchronized image transmitters and separate, synchronized sound transmitters are diplexed together and coupled to a common transmission antenna in such a manner that even in the event of failure or breakdown of one of the image transmitters, one of the sound transmitters, and/or one of the diplexing means, all of the available signal energy from the operative transmitters will still be fed to the common antenna in order to cause only a minimal drop in the radiated energy, and to accomplish this result without any interruption in the transmission of said energy. Other objects will appear.

As will be described presently, the objects of the invention are achieved through the provision of improved multi-source coupling means which, very broadly, involve a pair of hybrid junctions interconnected in cascade with at least one variable phase shifter interposed in the interconnecting lines. The applicant is well aware that the provision of cascaded hybrid junctions, with or without phase shift means, has been suggested in the prior art for various coupling purposes, such as the diplexing of image and sound transmitters to a common antenna in television transmission systems. In such prior multi-hybrid multi-source coupling systems, the sources to be coupled to the common antenna were not synchronous sources as in the present invention, nor were the systems constructed and operated for maintaining the correct, optimal, feed of all the available signal energy to the antenna in case of a failure of one of the sources and in case of an unbalance between the output amplitudes of the sources.

SUMMARY OF THE INVENTION

The invention provides a system for coupling at least two sources of equal-frequency signal energy to a common utilization device, comprising an input hybrid junction having a pair of input terminals connected to respective ones of said sources, an output hybrid junction having output terminals respectively connected to the common utilization device and a load, means interconnecting the output terminals of the input hybrid junction and the input terminals of the output hybrid junction and variable phase shift means interposed in said interconnecting means, whereby in the event of an unbalance between the output amplitudes from the respective sources, readjustment of said variable phase shift means will restore the correct feed of all the available signal energy from the respective sources to the utilization device. It will be understood that the above mentioned unbalance between the output amplitudes of the sources includes, as a special instance, the case where one of the sources fails completely.

As applied to a television transmission system including two synchronous image transmitters and two synchronous sound transmitters, the coupling system of the invention may include two input hybrid junctions one of which has the pair of image transmitters connected to its input terminals and the other of which has the pair of sound transmitters connected to its input terminals, the output terminals of both input hybrid junctions being connected to the input terminals of the output hybrid junction through respective diplexers.

Further, in this last form of application of the invention, there is preferably provided at least one additional, or intermediate hybrid junction between the input hybrid junctions and the output hybrid junctions and associated additional variable phase shift means, whereby the correct feed of available energy to the antenna can be restored even in case of the failure of one of the diplexing means.

DESCRIPTION OF THE PREFERRED EMBODIMENTS

Figure 1:
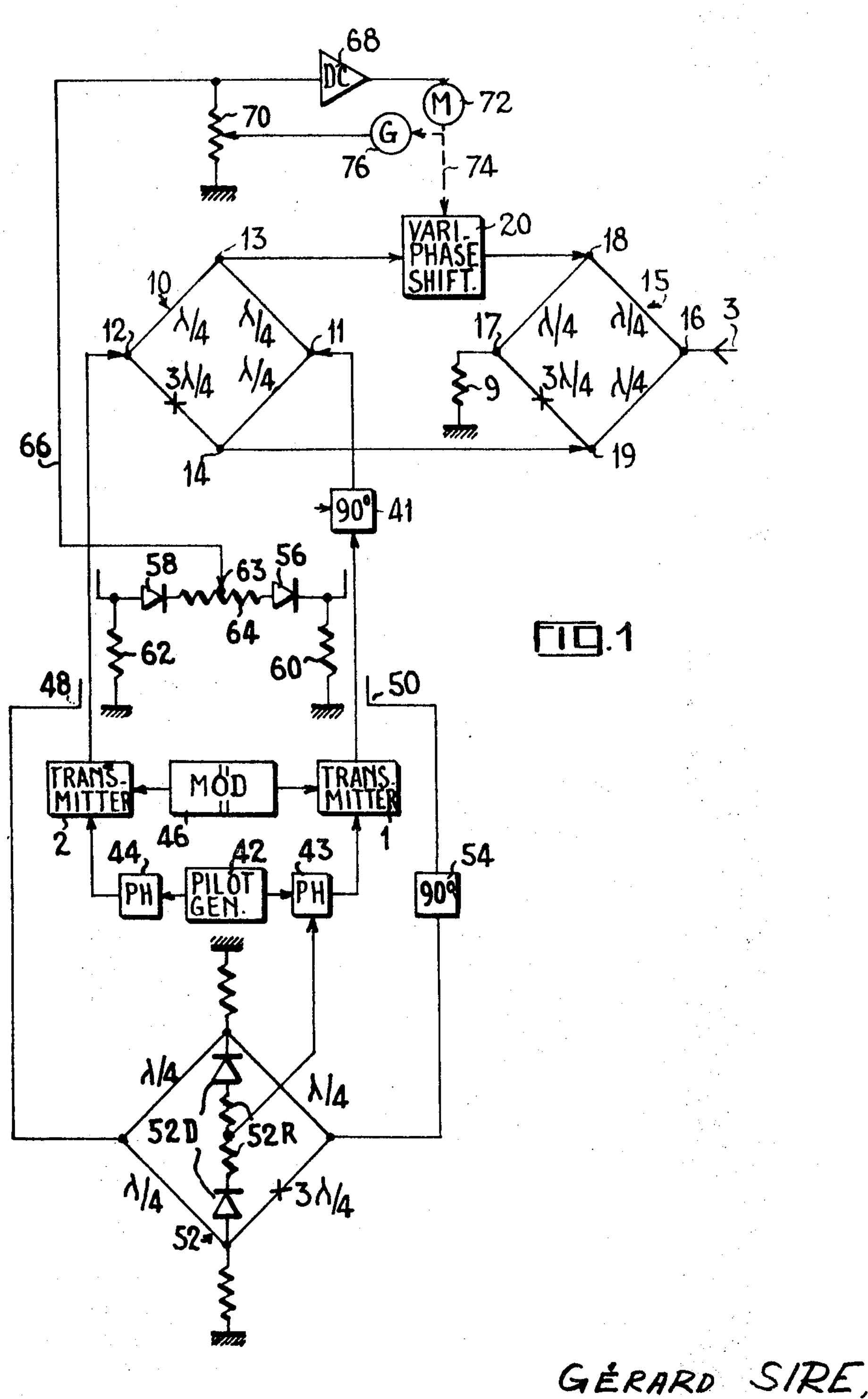
FIG. 1 is a circuit diagram, partly in block form of a basic form of embodiment of the invention as applied to a radio signal transmission system.

In the form of embodiment illustrated in FIG. 1, there is provided a pair of R-F signal transmitters 1 and 2, which are connected so as to transmit identical signals in the normal operating condition. The output signals from both transmitters are fed to a common transmission antenna 3 by way of a coupling system constructed according to the present invention, which inter alia includes the two hybrid junctions 10 and 15 as will be presently described.

Transmitters 1 and 2 are supplied with R-F carrier energy at a common stable frequency from a common pilot generator 42. Two identical modulator devices, or a common modulator device 46, are provided for modulating the carrier frequency in both transmitters with common information. Thus, the two transmitters normally produce output signals that are identical both in frequency and in amplitude. Preferably, a phase-lock arrangement is provided for maintaining a strictly synchronous relation between the transmitter outputs. This phase-lock arrangement is shown as being of the type disclosed in above-identified French Pat. No. 1,461,550 filed Oct. 22, 1965 and as including the hybrid 52 and associated components, and will be briefly described herein at a later point. For the present it is sufficient to say that the phase-lock arrangement operates to maintain substantial equality at all times between the phase conditions of the output signals from transmitters 1 and 2, but does not, of course, ensure that said outputs retain equal amplitudes.

The synchronous outputs from transmitters 1 and 2 are applied to the input terminals 11 and 12 of a first, or input, hybrid ring junction 10. A phase shifter 41, preferably adjustable, is connected between transmitter 1 and terminal 11. Hybrid 10 may be of the conventional "rat-race" type having four branches serially interconnected in a ring, and comprising waveguide or coaxial line sections. Three of said branches each have a length electrically equivalent to one fourth the wavelength (i.e. $\lambda/4$) of the average signal energy to be transmitted, while the fourth branch, as indicated by a cross, has an electric length equivalent to three fourths of said wavelength. The output terminals 13 and 14 of hybrid 10 are connected by way of coaxial or waveguide lines to the input terminals 18 and 19 of the second or output hybrid 15, similar to input hybrid 10. The output terminals 16 and 17 of hybrid 15 are connected respectively to antenna 3 and grounded dummy load 9. Connected in one of the two lines interconnecting both hybrids, as here shown the interconnecting line 13–18, is a variable phase shifter 20.

Figure 2A:
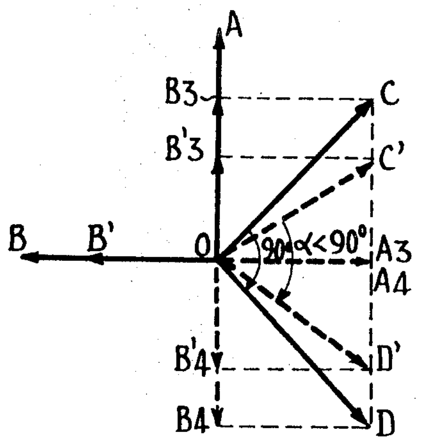
FIGS. 2*a* and 2*b* are vector diagrams illustrating the operating principle of the invention.

The coupling system operates as follows. Assuming first that both transmitters 1 and 2 are operating normally, then the synchronized outputs therefrom have equal amplitudes. The signal appearing at terminal 11 is lagging 90° over the signal at terminal 12 due to suitable initial adjustment of phase shifter 41. At each of the output terminals 13 and 14 of input hybrid 10, the input signals combine vectorially in a manner that will be clear from the vector diagram of FIG. 2*a*.

In this diagram the vectors OA and OB represent the equal-amplitude signal voltages in phase quadrature applied respectively to terminals 11 and 12 in the normal operating conditions. The A-signal voltage from 11 is equally divided over the quarter-wave branches 11–13 and 11–14 so as to appear at output 13 as the 90°-lagging voltage vector A3 and at output 14 as the 90°-lagging voltage vector A4, cophasal with A. Each of these vectors A3 and A4 is equal in amplitude to $1/\sqrt{2}$ times the voltage vector A. The B-signal voltage from 12 is passed over the quarter-wavebranch 12–13 so as to appear at output 13 as the 90°-lagging voltage vector B3, and is passed over the three quarter-wave line 12–14 to appear at output 14 as the 270°-lagging vector B4; each of vectors B3 and B4 again being $1/\sqrt{2}$ times the amplitude of vector B. Vectors A4 and B4 combine to produce the resulting voltage OD at output 14, and vectors A3 and B3 combine to produce the resulting voltage OC at output 13. The output voltages OC and OD are seen to be of equal amplitude (that of the input voltages) and in quadrature, with OD lagging over OC.

Thus, if the phase shift device 20 is normally adjusted for a 90° phase shift, the two output signals from input hybrid 10 reach the input terminals 18, 19 of output hybrid 15 in co-phasal relation. In the output hybrid 15, the two co-phasal signal vectors combine additively at the terminal 16 to feed all of the available input energy, i.e the combined energy from both transmitters 1 and 2, to the antenna 3 to be radiated thereby, and combine subtractively at terminal 17 so that none of the input energy is lost to the load 9.

Figure 2B:
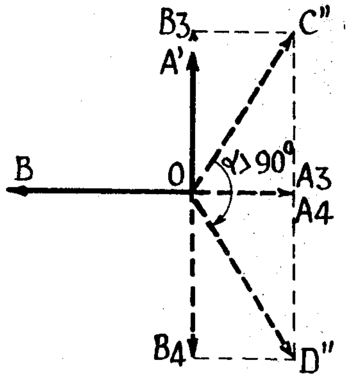

Assume now that owing to a defective operation of one or both of the transmitters, due perhaps to differential aging of the circuits, the strength of the two output signals from the transmitters become different. The input hybrid 10 will still operate to distribute the signal energy between the two output terminals 13 and 14 so that the signals appearing at these terminals still are equal in amplitude. Because however of the unbalance between the input amplitudes the output signals 13 and 14 are no longer in phase quadrature but have a relative phase displacement less or more than 90° depending on the sense of the input unbalance. More precisely, referring again to FIG. 2*a*, assume that due to a defect in transmitter 2 the voltage amplitude applied to terminal 12 has dropped from OB to OB'. A vector construction similar to that described above shows that the output signal voltages appearing at terminal 13 and 14 are now represented by the reduced-amplitude vectors OC' and OD', which still are equal in amplitude but now are phase displaced from each other by an angle $\alpha$ less than 90°. Therefore, by readjusting phase shifter 20 to the angular value $\alpha$, correct operation will be restored. Similarly, should the voltage amplitude applied from transmitter 1 to terminal 11 drop to a value OA' less than its normal value OA as shown in the diagram of FIG. 2*b*, then a similar construction will show that now the reduced-amplitude at signals OC'' and OD'' appearing at terminals 13 and 14 while still of equal amplitude, are phase displaced from each other by an angle $\alpha$ greater than 90°. Again readjustment of phase shifter 20 to the proper angular value will restore correct total feed of all the available energy to the antenna.

In extreme cases where one or the other of the transmitters 1 and 2 fails completely, correct feed will be restored by adjusting phase shifter 20 to a null phase shift condition or a 180° phase shift condition. More precisely, it will be apparent from the diagrams of FIGS. 2*a* and 2*b*, that in the event of total power failure of transmitter 2, $\alpha=0$, and phase shifter 20 should be adjusted to impart a zero phase lag to the signal passing through it, while in case of total failure of transmitter 1, $\alpha=180°$ and phase shifter 20 should be adjusted to impart 180° phase lag.

It will thus be seen that in any case of partial or total unbalance of the transmitter output amplitudes, the variable phase shifter 20 of the invention can be adjusted to a suitable value different from its initial 90° setting in order to restore the requisite phase equality relation between the input terminals 18 and 19 of the output hybrid 15, and thereby ensure that the full combined power from both transmitters will still be applied to the antenna.

It will of course be understood that in either instance of unbalanced operation described the total power applied to antenna 3 will be somewhat less than that applied in normal operation. Thus if P is the normal power output of each transmitter 1 and 2, then in normal operation the applied power is 2P. Assuming one of the transmitters breaks down, then in the absence of the coupling system of the invention the power fed to the antenna would be $P/2$, because one half of the power output from the single transmitter remaining in operation would be lost to the dummy load, if a single coupling hybrid were used. With the dual-hybrid coupling system shown in FIG. 2, however, in similar circumstances the full power output P from the single operative transmitter is fed to the antenna after appropriate readjustment of phase shifter 20, as explained above. Moreover, because such phase shift is effected progressively there is no break in the signal transmission from antenna 3, of the kind that would inevitably occur if a switch was used to connect the single transmitter remaining in working order direct to the antenna feed line.

While in some cases it may prove satisfactory to effect the readjustments of the variable phase shifter 20 by manual means, according to an important aspect of the invention this action is accomplished automatically, and exemplary means for this purpose is illustrated in FIG. 1. The outputs from transmitters 1 and 2 are shown tapped by way of unidirectionally poled rectifier diodes 56 and 58, having their outwardly directed terminals grounded through resistors 60, 62. The free terminals of the diodes are interconnected by a resistor 64, having an adjustable mid-tap 63 connected through a line 66 to the input of a D-C amplifier 68, and grounded through an input load resistor 70. Amplifier 68 has its output connected to a reversible servo-motor 72 which by way of a suitable mechanical link 74 actuates the adjusting element of variable phase shifter 20. Motor 72 also drives a rate generator 76 whose variable output is fed back to a tap on the input load resistor 70 to provide a conventional rate feedback servo-loop. In operation, so long as the synchronous outputs from both transmitters 1 and 2 are of equal amplitude, terminal 63 remains at ground potential, amplifier 68 applies no input signal to motor 72 and phase shifter 20 retains its normal preset phast shift value of 90°. In case of a discrepancy or unbalance between the amplitudes of the transmitter outputs, an error voltage of one or the other polarity depending on the sense of the amplitude unbalance appears at terminal 63 and is applied through amplifier 68 to motor 72 which then actuates phase shifter 20 to alter its phase shift adjustment in a sense to nullify the error voltage. The feedback loop including generator 76 and resistor 70 imparts linearity to the control action in the usual manner.

Figure 1A:
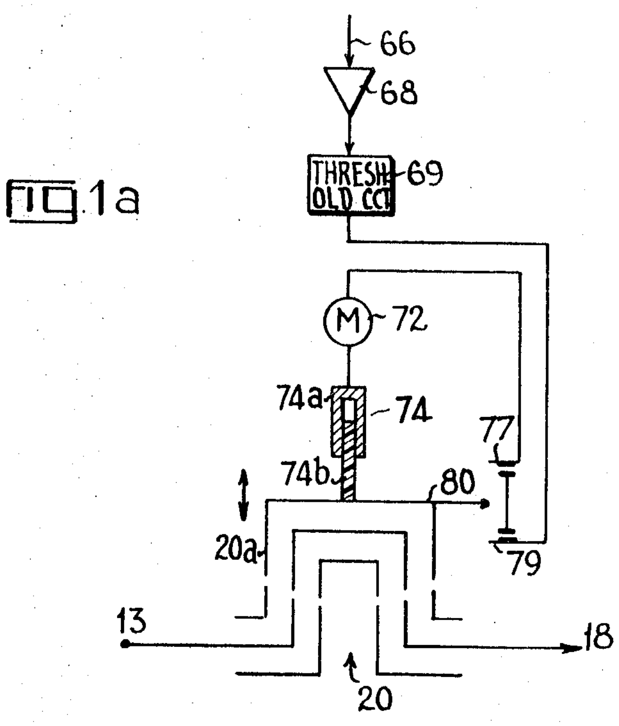
FIG. 1*a* illustrates a modification of part of FIG. 1.

It will be understood that various alternative arrangements may be devised for automatically controlling the adjustment of phase shifter 20 for the purposes of the invention. Thus, the amplitude unbalance sensing circuit developing the error signal applied to the servo-motor here shown as being connected to the outputs of transmitters 1 and 2, may instead be connected to another suitable point of the system. Another possibility, useful in the practically important case where it is desired to guard only against a complete failure of one of the transmitters, is to provide a simplified all-or-nothing, or non-linear, type of phase shift control action as schematically shown in FIG. 1*a*. In that figure, the variable phase shifter 20 is shown in somewhat greater detail as consisting of a conventional variable-length coaxial-line section or "trombone" type phase shifter. This, as schematically shown, includes a displaceable coaxial-line section **20*a* which is displaceable in both directions indicated by the two-headed arrow for altering the effective electrical length of the line and hence the phase shift adjustment in either sense from a preset intermediate value. The output from D-C amplifier 68 is in this case shown applied to reversible D-C motor 72 by way of a conventional threshold detector circuit 69 and two pairs of serially interconnected limit switch contacts 77, 79 each of which is normally closed but is opened by an actuating arm 80 projecting from the displaceable phase shift member 20*a* said member reaches a related one of its two end positions, corresponding to the end adjustment values of 0 and 180°, respectively. Motor 72 actuates the displaceable member 20*a* through a mechanical link 74 shown as comprising a nut member 74*a* secured to the motor output shaft and engaging a screw rod 74*b* secured to the member 20*a* shown. Threshold detector circuit 69 is adjusted to deliver no output so long as the amplified error voltage on line 66 is less in absolute value than a prescribed value corresponding to the full normal output voltage of a transmitter, or somewhat less than said full output voltage. In case of failure of either transmitter the threshold circuit 68 produces a fixed D-C voltage signal corresponding in polarity to that of the voltage at point 63 which in turn depends on which transmitter has failed. Motor 72 is then driven in one or the other direction to displace phase-shift adjusting member 20*a* in a corresponding direction through screw-and-nut gearing 74. Member 20*a* is then displaced to the appropriate one of its end positions, in which the phase shift adjustment is 0 or 180° as the case may be. When such end position has been reached the related limit switch 77 or 79 is opened and motor 72** is stopped. In a modified version of the control arrangement of FIG. 1*a*, motor 72 is connected for being energized with a voltage of one or the other polarity upon operation of a related one of two circuit breakers or the like (not shown), which are commonly associated with the transmitters 1 and 2 in a radio or television transmission system and which open upon failure of the respective transmitters.

The phase lock arrangement shown in FIG. 1 for precisely synchronising the transmitters 1 and 2 will now be briefly described. As shown, the output signal energy from both transmitters 1 and 2 is tapped by means of suitable probes 48 and 50 and applied to the respective input terminals of a hybrid junction 52 which may be similar to the other hybrid junctions referred to herein. The signal tapped from transmitter 1 is applied to the related input of hybrid 52 by way of a 90° phase shifter 54. Across the output diagonal of the hybrid ring are connected two rectifier diodes 52D in series aiding relation, interconnected by two resistors 52R the common junction of which is applied to a variable phase shifter 43 interposed in the connection from pilot generator 42 to transmitter 1, the apexes of this diagonal being earthed through respective resistors. Phase shifter 43 may be of the varactor controlled type. In operation, the signals tapped at 48 and 50 and applied to the inputs of hybrid 52 divide between the branches of the hybrid as earlier described so as to add vectorially at the upper output terminal of the hybrid and subtract vectorially (owing to the $3\lambda/4$ branch) at the lower output terminal. Assuming the transmitter outputs are strictly cophasal, the two input signals are in quadrature (owing to phase shifter 54) and it is then shown vectorially that the signals at both hybrid output terminals are equal in amplitude so that, the diodes 52D being traversed by current, the voltage difference appearing at the common junction of the resistors 52R is zero, and phase shifter 43 retains its initial phase setting equal to that of fixed phase shifter 44. Should the transmitter outputs depart from their cophasal relation, regardless of any difference in amplitude between them, the signals applied to the inputs of hybrid 52 are no longer in quadrature. The resultant at the upper and lower outputs of the hybrid are then still in quadrature but are of unequal amplitude, and amount of the sense the amplitude difference corresponding to the sense and angle of the phase discrepancy between the signals. A voltage signal of corresponding polarity and magnitude then appears at the common junction of resistors 52R and adjusts the phase shifter 43 to alter the phase of the carrier frequency supplied to transmitter 1 in a sense and by an amount to correct the phase discrepancy.

Figure 3:
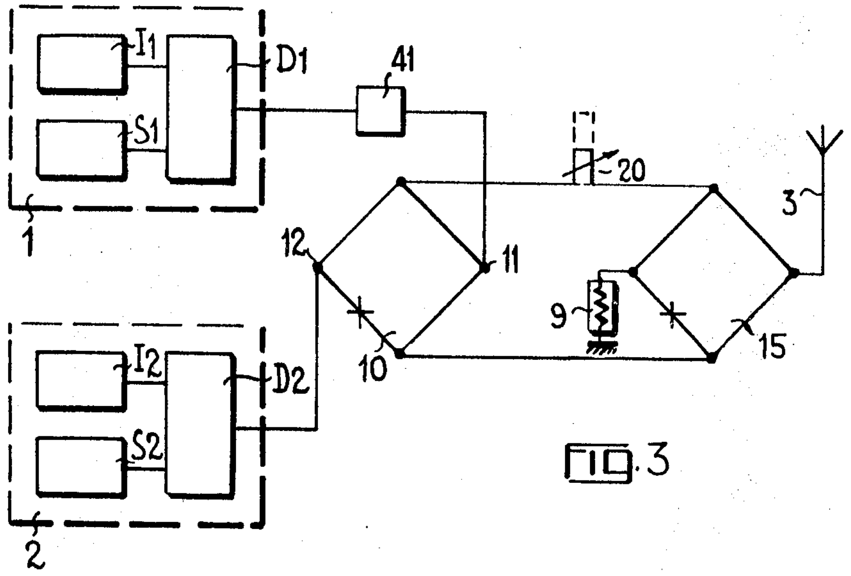
FIG. 3 illustrates a system generally similar to that of FIG. 1, wherein each of the transmitters of that figure is shown as comprising an image transmitter and a sound transmitter, diplexed.

In the embodiment shown in FIG. 3 the general layout is the same as in FIG. 1. Corresponding components are designated by the same reference numerals and will not again be described. This figure serves to illustrate in somewhat greater detail the manner in wihch the FIG. 1 embodiment would be used in the specific case of a television transmission station. Each of the transmitter assemblies 1 and 2 is seen to comprise a visual or image transmitter, I1 and I2, and an aural or sound transmitter, S1 and S2. The outputs from both transmitters in each of the assemblies 1 and 2 are combined by means of a conventional diplexer D1 and D2, to produce a composite signal at the common output of each transmitter assembly. These composite signals are then applied to the respective input terminals 11 and 12 of the input hybrids 10, as in FIG. 1. It will be understood that here as in the FIG. 1 embodiment, means (not shown) are provided for synchronizing the output signals from both transmitter assemblies 1 and 2 in frequency and phase. Also, any suitable automatic control means, e.g. of the type shown in FIG. 1 or FIG. 1*a*, may be provided for adjusting the variable phase shifter 20. Such means have not been shown in FIG. 3 for clarity.

It may here be noted that the feature of the invention according to which the redistribution of the available power to the antenna in case of the failure of a transmitter is effected as a gradual phase shift adjustment that does not entail a breakin signal transmission is of special significance in regard to the transmission of image signals, since even a very short break in such transmission can result in a relatively long and highly objectionable interruption of picture display at the receiving end.

In the setup of FIG. 3 it will be apparent that the failure of any one of the three component units shown in each transmitter assembly, namely visual transmitter, sound transmitter and diplexer, will result in the whole transmitter assembly of which the defective unit forms part, being cut out of the circuit. In the embodiment now to be described with reference to FIG. 4, the visual and aural transmitters units in each assembly are connected independently so that the failure of either of these units will not cut out the other unit.

Figure 4:
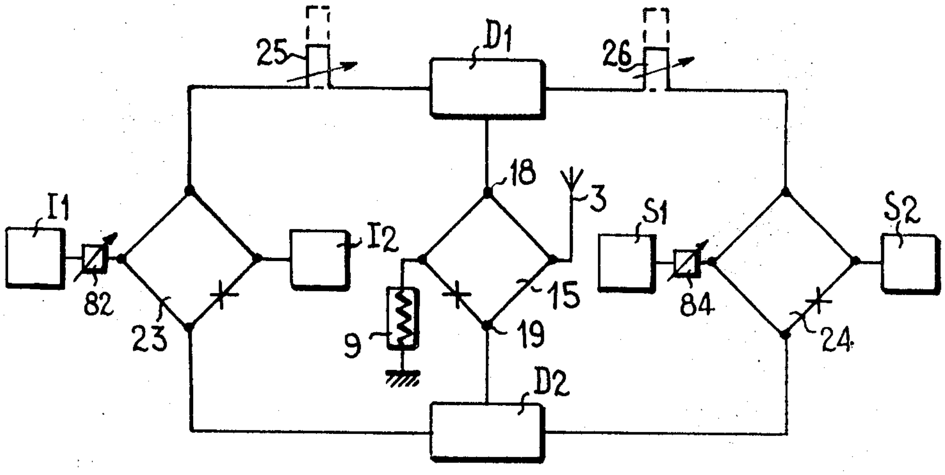
FIG. 4 shows a preferred modification of the television transmission system of FIG. 3.

As shown in FIG. 4, the image transmitters 11 and 12 of the respective transmitter assemblies are connected to the input terminals of a first input hybrid 23, and the sound transmitters S1 and S2 of the respective assemblies are connected to the input terminals of a second input hybrid 24. First output terminals of the respective input terminals of the respective input hybrids 23 and 24 are connected by way of respective variable phase shifters 25 and 26 to the inputs of a first diplexer D1. The other output terminals of the respective input hybrids are connected directly to the inputs of a second diplexer D2. The diplexer outputs are connected to the input terminals 18 and 19 of the output hybrid 15, which has its output terminals connected to antenna 3 and dummy load 9 as in the preceding embodiments. Transmitters I1 and S1 are shown connected to their related hybrid input terminals by way of adjustable phase shifters 82 and 84.

With this arrangement, it will be apparent that should either of the image transmitters I1, I2 fail, readjustment of phase shifter 25 will permit the system to operate with all of the power available from the remaining image transmitter I2 or I1 and both sound transmitters S1 and S2. Similarly in case of failure of either sound transmitter S1 and S2, readjustment of variable phase shitfer 26 will permit correct operation of the system with all of the power available from the remaining sound transmitter S2 or S1 and both image transmitters I1 and I2. In case of simultaneous failure of an image transmitter and a sound transmitter, simultaneous readjustment of both phase shifters 25 and 26 will ensure operation with all of the remaining signal power available from the remaining two transmitters.

It will be understood that automatic control means e.g. of the type described with reference to either of FIGS. 1 or 1*a* may be provided in the system of FIG. 4 for automatically actuating either or each of the variable phase shifters 25 and 26, in dependency on the difference in amplitudes appearing across the input terminals of the related input hybrid 23 or 24 respectively.

Figure 5:
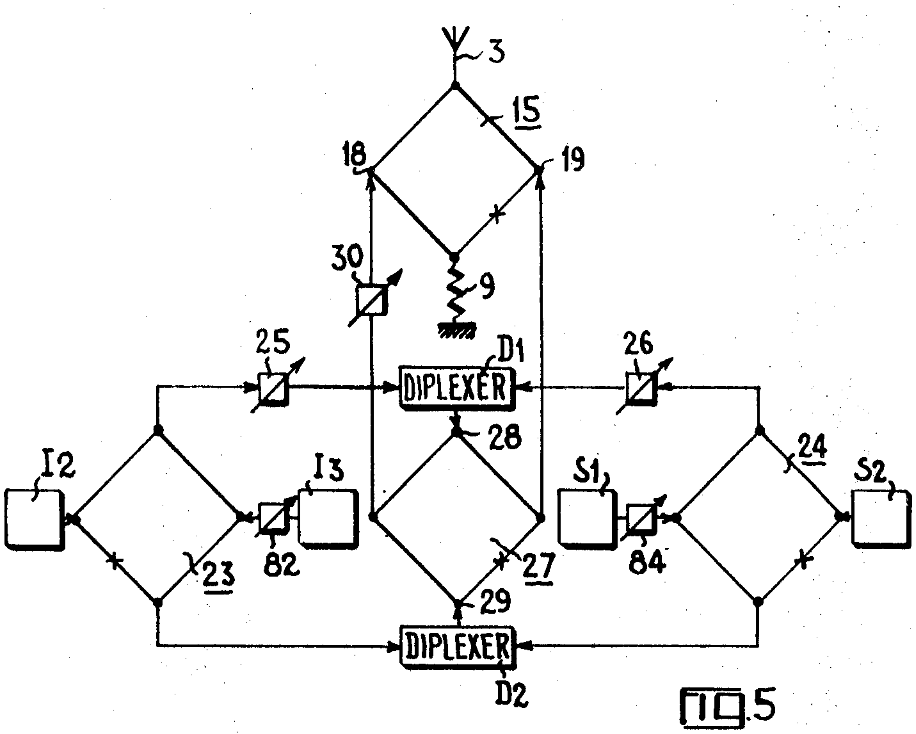
FIG. 5 shows a further preferred embodiment, including provision for the failure of either a transmitter or a diplexer.

In the further embodiment of the invention illustrated in FIG. 5, the arrangement is such that the optimal distribution of the full available power to the antenna will be ensured not only in the event that either of the visual transmitters I1, I2, and/or either of the aural transmitters S1, S2 should fail, but likewise in case of failure of either of the diplexers D1, D2, a result not obtainable in the case of the FIG. 4 embodiment.

In FIG. 5, the parts of the system that are similarly numbered and similarly interconnected as the corresponding parts in FIG. 4 will not be described anew. As will be apparent from a comparison of the two circuit diagrams, the difference lies in the fact that the diplexers D1 and D2 in FIG. 5 instead of having their output terminals connected to the input terminals 18 and 19 of the output hybrid 15, have their output terminals connected to the input terminals 28 and 29 of an intermediate hybrid 27 similar to the hybrid ring junctions previously described. One output terminal of intermediate hybrid 27 is connected to one input terminal, 19, of output hybrid 15, directly, while the other intermediate hybrid output terminal is connected to the remaining output hybrid input terminal 18 through adjustable phase shifter 30.

In the system of FIG. 5, it will be evident that considering only the pair of hybrids 27 and 15 together with their input and output connections, the diplexers D1 and D2 play the same role as that performed by the transmitters 1 and 2 in the basic embodiment of FIG. 1.

In the system of FIG. 5, should one of the image transmitters I1, I2, or/and one of the sound transmitters S1, S2 fail, readjustment of phase shifter 25 or/and phase shifter 26 will redistribute the feed of signal energy from the remaining image and sound transmitteers to both diplexers D1 and D2 to restore the desired quadrature relation between the signal energies delivered by said diplexers, as in FIG. 4, whereupon the system will operate correctly with the full available energy applied to antenna 3. In addition, and contrary to FIG. 4, should either of the diplexers D1 and D2 fail, while all four transmitter units remain in operation, it still is possible to redistribute the feed energy to the antenna by way of the single operative diplexer. For this purpose it is simply necessary to readjust the phase shifters 82 and 84 so that the energies applied to the inoperative diplexer shall be in phase opposition. Thus, if the defective diplexer is D1, phase shifters 82 and 84 would be adjusted each to introduce a phase shift angle of 180°, whereby no net energy is fed to the defective diplexer D1 and all the energy is fed to the diplexer D2. The variable phase shifter 30 can then be readjusted to a phase shift angle of 180° so as to pass all of the energy from the input terminal 29 of hybrid 27 in cophasal relation to the input terminals 18 and 19 of output hybrid 15, and thence to the antenna. Similarly, should diplexer D2 fail, phase shifters 82 and 84 would be adjusted to introduce zero shift angles, whereupon all of the energy from the transmitters is fed to diplexer D1, and phase shifter 30 would be readjusted to introduce a zero phase shift and thereby pass all of the energy from input terminal 28 of hybrid 27 cophasally to output hybrid input terminals 18 and 19 and thence to the antenna.

In the arrangement last described, concurrent failure of one of the transmitters and of a diplexer would not permit of feeding all of the available power to the antenna because it would not then be possible to adjust the phase shifters in such a way as to nullify the energy applied to the defective diplexer. This further result, however, is accomplished with the embodiment shown in FIG. 6.

In this embodiment, the difference over FIG. 5 lies in the provision of two additional hybrid junctions 31 and 32, each having its input terminals connected to the output terminals of the related input hybrids 23 and 24, one of two inupt connections of each of the hybrids 31 and 32 being through a variable phase shifter 25 or 26, and each of said additional hybride having its output terminals connected to related inputs of the diplexers D1 and D2. In other words, the additional hybrids 31 and 32 are interposed between the inputs hybrids and the diplexers of FIG. 5. In normal operation phase shifters 25 and 26 are set to introduce phase shift angles such that the signal energies applied across the inputs of each of the intermediate hybrids 31, 32 are in phase quadrature. In case of failure of one or more of the transmitter units, the phase shifters 25 and 26 are readjusted to maintain this quadrature relation. In the event of the failure of either of the diplexers without concomitant failure of a transmitter, phase shifters 25 and 26 would be readjusted to direct all of the input energy into the inputs of the operative diplexer, and variable phase shifter 30 would then also be readjusted to ensure that the signals reaching the input terminals 18, 19 of output hybrid 15 are cophasal, as in the preceding embodiment.

Finally, should either of the diplexers D1, D2 fail (alone or concurrently with the failure of one or more of the transmitter units) phase shifters 25 and 26 are adjusted to suitable values such that all of the available energy from the operative transmitters is directed to the single diplexer remaining in operation and phase shifter 30 is again adjusted to provide the desired cophasal relation across input terminals 18 and 19.

Figure 6:
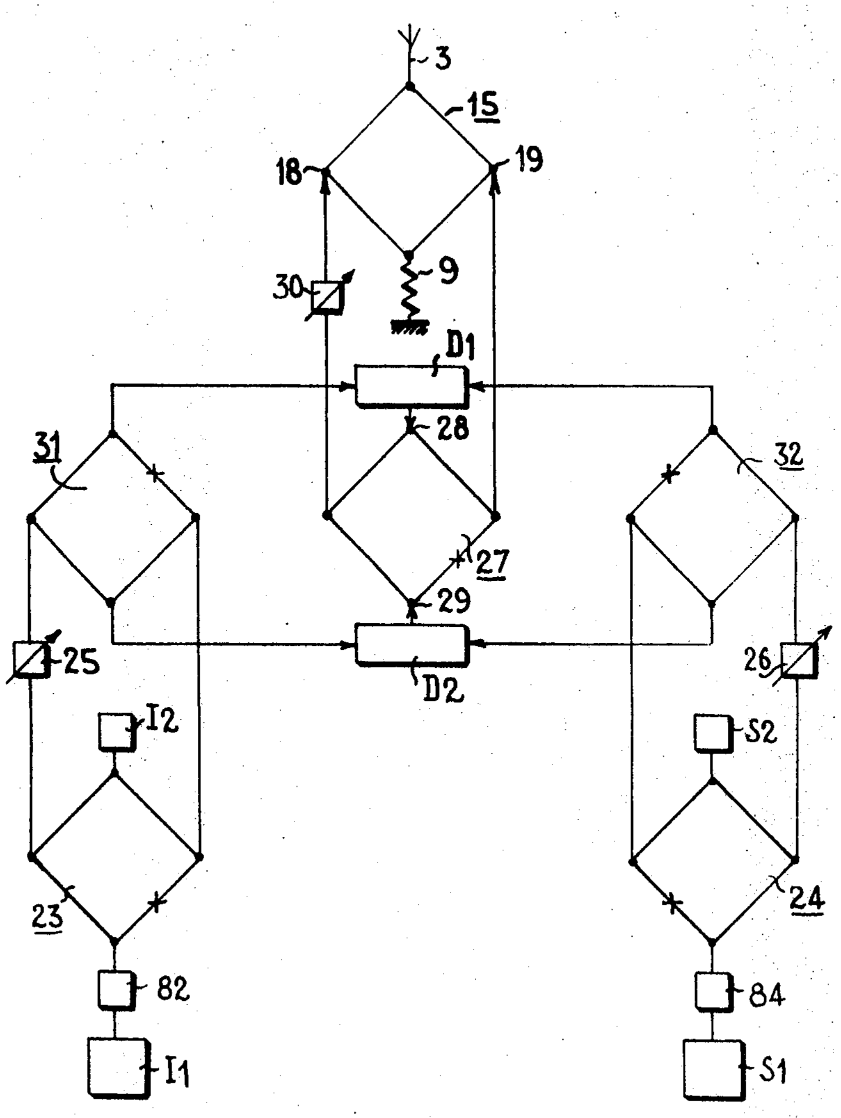
FIG. 6 shows a preferred embodiment including provision for the failure of both a transmitter and a diplexer.

The following table indicates the phase settings that are to be imparted to the variable phase shifters 25, 26 and 30 in each one of the instances of failure that can be corrected by the system of FIG. 6, it being clear of course that a simultaneous breakdown of both image transmitters, both sound transmitters or/and both diplexers cannot be corrected by the system.

| Disabled components | | | Phase shift adjustments | | |
|---|---|---|---|---|---|
| Diplexers | Image X'mitters | Sound X'mitters | 25 | 26 | 30 |
| Neither | Neither | Neither | 0 | 0 | 90° |
| Do | I1 | do | 90° | 0 | 90° |
| Do | I2 | do | 270° | 0 | 90° |
| Do | Neither | S1 | 0 | 90° | 90° |
| Do | I1 | S1 | 90° | 90° | 90° |
| Do | I2 | S1 | 270° | 90° | 90° |
| Do | Neither | S2 | 0 | 270° | 90° |
| Do | I1 | S2 | 90° | 270° | 90° |
| Do | I2 | S2 | 270° | 270° | 90° |
| D1 | Neither | Neither | 90° | 90° | 0 |
| D1 | I1 | do | 180° | 90° | 0 |
| D1 | I2 | do | 0 | 90° | 0 |
| D1 | Neither | S1 | 90° | 180° | 0 |
| D1 | I1 | S1 | 180° | 180° | 0 |
| D1 | I2 | S1 | 0 | 180° | 0 |
| D1 | Neither | S2 | 90° | 0 | 0 |
| D1 | I1 | S2 | 180° | 0 | 0 |
| D1 | I2 | S2 | 0 | 0 | 0 |
| D2 | Neither | Neither | 270° | 270° | 180° |
| D2 | I1 | do | 0 | 270° | 180° |
| D2 | I2 | do | 180° | 270° | 180° |
| D2 | Neither | S1 | 270° | 0 | 180° |
| D2 | I1 | S1 | 0 | 0 | 180° |
| D2 | I2 | S1 | 180° | 0 | 180° |
| D2 | Neither | S2 | 270° | 180° | 180° |
| D2 | I1 | S2 | 0 | 180° | 180° |
| D2 | I2 | S2 | 180° | 180° | 180° |

Figure 7:
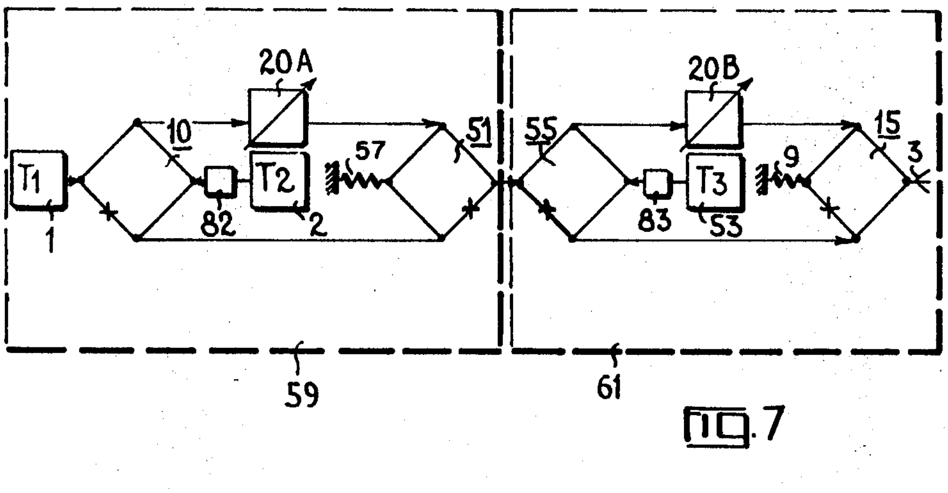
FIG. 7 illustrates an embodiment of the invention in which three sources, e.g. radio transmitters, are coupled to a common utilization device, e.g. antenna.

While in all of the embodiments so far disclosed the multi-source coupling system of the invention was used for coupling even numbers (two or four) of sources to a common utilization device, the invention is equally applicable in cases where the number of sources to be coupled is odd. Thus FIG. 7 illustrates an exemplary arrangement according to the invention for coupling three transmitters 1, 2 and 53 to a common transmission antenna 3. Transmitters 1 and 2 are connected to the inputs of a first input hybrid junction 10, a phase shifter 82 being shown interposed in the connection from transmitter 2 The output terminals of hybrid 10 are interconnected with the respective input terminals of an intermediate hybrid junction 51, a variable phase shifter 20A being interposed in one of the interconnecting lines. Transmitter 53 is connected (as here shown through a phase shifter 83 which may be adjustable) to one input terminal of a second input hybrid junction 55. The intermediate hybrid 51 has one of its output terminals connected to the free input terminal of hybrid 55, while the remaining output terminal of hybrid 51 is connected to a grounded dummy load 57. The output terminals of second input hybrid 55 are interconnected with the input terminals of output hybrid junction 15, a second variable phase shifter 20B being interposed in one of the interconnecting lines. Output hybrid 15 has one output terminal connected to antenna 3 and its other to grounded dummy load 9.

The operation of this embodiment will be readily understood when it is realized that the system can be broken down into two sections as indicated by the broken-line boxes 59 and 61. If box 61 is regarded as constituting the common utilization device of the system, substitutable for the antenna 3 in FIG. 1, then the remainder of the system of FIG. 7, contained in box 59, is seen to be comparable to the coupling system of FIG. 1. Alternatively, if box 59 is regarded as constituting a single signal source, substitutable for e.g. the source 2 in FIG. 1, then the remainder of the system of FIG. 7, within box 61, is seen to be comparable to the coupling system of FIG. 1 plus another signal source (53). It will thus readily be understood that in case of total or partial failure of one or two of the three transmitters 1, 2 and 53, the phase shifters can be readjusted to feed all of the remaining available power from the operative transmitters to the common antenna 3.

More elaborate multi-source coupling systems can readily be designed, as by combining the set-up FIG. 7 with any one of the set-ups shown in FIGS. 3–6.

Figure 8:
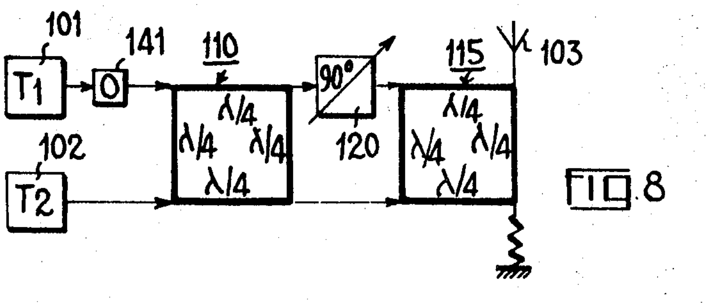
FIG. 8 shows a variation of the basic embodiment of the invention shown in FIG. 1, using an alternative form of hybrid ring junction.
Figure 9:
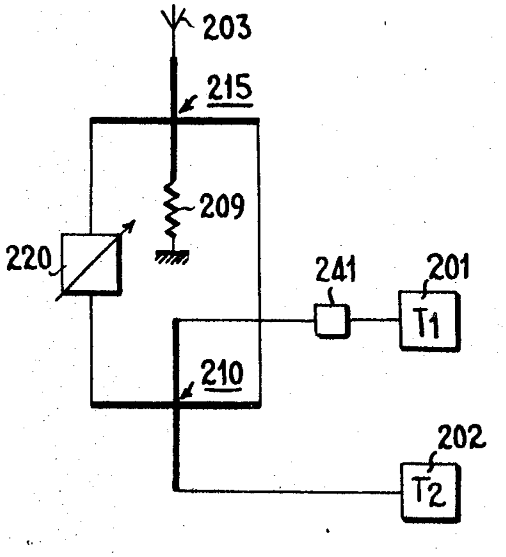
FIG. 9 similarly illustrates another variation of the basic embodiment using T-type hybrid junctions instead of ring junctions.
Figure 10:
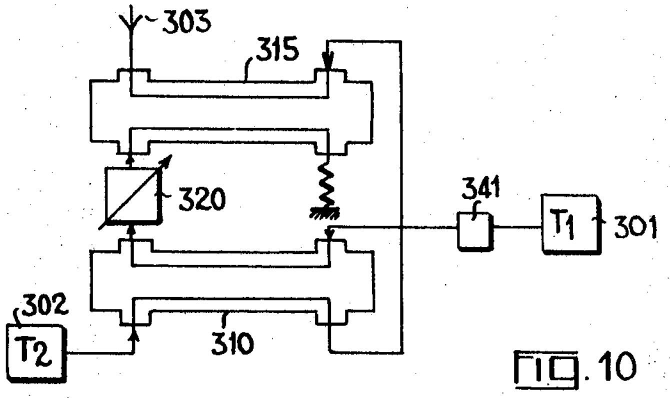
FIG. 10 similarly shows yet another variation of the same basic embodiment using directional couplers as the hybrid junctions.

The hybrid junctions that are usable in the coupling systems of the invention, are not necessarily of the type disclosed above with reference to each of the embodiments of FIGS. 1–7 as consisting of a ring of four branches three of which are $\lambda/4$ long and the fourth is $3\lambda/4$ long. Various other types of hybrid junctions can be used, and further examples are shown in FIGS. 8–10. In each of these figures, the general arrangement is the same as that shown for the basic embodiment of the invention in FIG. 1, only the form of hybrid junctions used being shown different. In FIGS. 8–10, the components are designated with the same reference numerals as are the corresponding components in FIG. 1, plus 100 (in FIG. 8), 200 (in FIG. 9) and 300 (in FIG. 10). The systems will not therefor be described in any detail, only the particular type of hybrid junction shown in each of the three systems being indicated in the following.

In FIG. 8, the hybrid junctions 110 and 115 are each of the type comprising a ring of four branches each one quarter wave long. With such an arrangement, a pair of cophasal input signals applied to any consecutive pair of terminals around the ring will result in a pair of cophasal output signals at the other two terminals.

In FIG. 9, the hybrid punctions 210 and 215 are each of the T-junction type. A detailed disclosure of one form of T-hybrid junction usable in this embodiment may be found, for example, in the assignees Austrian Pat. No. 251,058.

In FIG. 10, each of the hybrid junctions 310 and 315 is a directional coupler, here shown by way of example as being of the so-called "3-decibel" conventional type.

Hybrid junctions of any of the types shown in FIGS. 8–10, as well as any other devices serving an equivalent function, may be substituted into any one of the embodiments of this invention as disclosed with reference to FIGS. 1 and 3–7.

It will be understood that in each of the embodiments disclosed with reference to FIGS. 3–10, the showing has been considerably simplified for clarity. In practice, each of the systems shown in those figures may, and preferably would, include the frequency and phase synchronizing means shown in FIG. 1, as well as automatic control means associated with some or all of the phase shifters, of the kind disclosed with reference to FIG. 1 or FIG. 1*a*.

In view of the many different types of hybrid junction usable in the system of the invention, as exemplified in FIGS. 1, 8, 9 and 10, it is important that the expression "hybrid junction" as used in this specification and the appended claims, shall be interpreted in accordance with a broad yet precise definition of that expression. For the purposes of this invention, therefore, a hybrid junction is defined as a signal transfer device having two inputs and two outputs, so connected that all of the active signal power applied to both inputs is transferred to both outputs, and wherein moreover the inputs are decoupled from each other, that is, wherein there is no interaction between the signal energies applied to the respective inputs. This definition does not depart essentially from the generally accepted definition of hybrid junctions as used in the art.

What I claim is:

1. A system for coupling two pairs of signal sources having equal signal frequencies in each pair, to a common utilization device, comprising:

two input hybrid junctions each having a pair of input terminals and a pair of output terminals;

an output hybrid junction having a pair of input terminals and a pair of output terminals;

a pair of diplexers each having two inputs and an output;

means connecting each said pair of sources to respective input terminals of a related one of said input hybrid junctions;

means connecting said utilization device to one output terminal of said output hybrid junction, and a load connected to the other output terminal of said output hybrid junction;

means interconnecting the output terminals of each input hybrid junction with related inputs of the respective diplexers;

further means connecting the outputs of the diplexers with respective input terminals of said output hybrid junction; and variable phase shift means interposed in said interconnecting means; whereby on occurrence of an unbalance between the signal amplitudes from the sources of either pair, readjustment of said variable phase shift means will maximize the feed of energy to said utilization device regardless of said unbalance.

2. The system defined in claim 1, including further adjustable phase shift means in the connection between at least one source in each pair and the related input terminal of the related input hybrid.

3. The system defined in claim 1, wherein said sources of a first pair are image transmitters and the sources of the other pair are sound transmitters of a common television transmission system, and said common utilization device is a transmission antenna.

4. The system defined in claim 1, wherein said further connecting means includes an intermediate hybrid junction having a pair of input terminals connected to the outputs of the respective diplexers and having output terminals connected to the respective input terminals of said output hybrid junction.

5. The system defined in claim 4, including further variable phase shift means connected to one output terminal of said intermediate hybrid junction and the input terminal of the output hybrid junction connected thereto.

6. The system defined in claim 1, wherein said interconnecting means includes two further hybrid junctions each having a pair of input terminals connected to the output terminals of the respective input hybrid junctions and each having a pair of output terminals connected to inputs of the respective diplexers.

7. The system defined in claim 6, wherein said variable phase shift means comprise a pair of variable phase shifters each interposed in the connection from one output terminal of each input hybrid junction to the related input terminal of the related further hybrid junction.

8. A multi-source signal coupling system comprising:
- a first (10) and a second (15) hybrid junction, each having a pair of input terminals and a pair of output terminals;
- two signal source means (1, 2) delivering equal-frequency output signals, each respectively connected to the input terminals of the said first hybrid junction;
- a common utilization device (3) and a dissipative load (9) respectively connected to the output terminals of said second hybrid junction (15);
- means (56, 58, 60, 62, 63, 64) sensing a discrepancy between the output amplitudes of said sources;
- connection means provided between an input terminal of said second hybrid junction and an output termial of said first hybrid juction, including adjustable phase shift means (20) connected to said sensing means and responsive to a sensed discrepancy at the output of said sensing means shifting the phase of the signal between said hybrid junctions in a direction maximizing the feed of signal energy to said common utilization device regardless of an unbalance between the amplitudes of the signals delivered by the two signal source means;
- and means interconnecting free terminals of the respective hybrid junctions.

9. The system defined in claim 8, wherein one of said signal source means comprises a phase shifter, whereby the relative phase condition of the output signals of said signal source means is predetermined in such a way that the amplitudes of the signals delivered on the output terterminals of said first hybrid junction are equal.

10. The system defined in claim 8 wherein at least one of said signal source means includes (FIG. 7):
- a pair of further hybrid junctions (23, 31), each having a pair of input terminals and a pair of output terminals;
- a pair of signal sources ($T_1$, $T_2$) respectively connected to the input terminals of one (10) of said further hybrid junctions;
- a dissipative load (57) connected to an output terminal of the other (51) of said further hybrid junctions;
- means (56, 58, 60, 62, 63, 64) sensing a discrepancy between the output amplitudes of said signal sources;
- connection means provided between an input terminal of said other (51) of said further hybrid junctions and an output terminal of said one (10) of said further hybrid junctions, including further adjustable phase shift means (20A) connected to said sensing means and responsive to a sensed amplitude dispancy at this output of said sensing means shifting the phase of the signal between said further hybrid junctions in a direction maximizing the feed of signal energy to the other output terminal of said other (51) of said further hybrid junctions, so constituting the output of said one signal source means, regardless of an unbalance between the amplitudes of the signals delivered by said pair of signal sources;
- and means interconnecting free terminals of the respective further hybrid junctions.

11. The system defined in claim 8 wherein said means sensing a discrepancy between the output amplitudes of said sources include means (72, 74, 76, 70) automatically varying the adjustment of said adjustable phase shift means in response to said amplitude discrepancy.

12. The system defined in claim 8 including a common pilot frequency generator connected for feeding signal energy to both said signal source means, means for varying the relative phase condition of the output signals produced by said sources, and means connected for sensing a discrepancy between the phase conditions of said output signals and connected for adjusting said last-mentioned phase varying means to reduce said phase discrepancy.

13. The system defined in claim 12 wherein said last-mentioned sensing and adjusting means comprises a hybrid junction having a pair of input terminals respectively connected with the said signal source means outputs and a rectifier circuit connected across the output terminals of said last-mentioned hybrid junction, said rectifier circuit being connected for adjusting said last-mentioned phase-varying means.

References Cited

UNITED STATES PATENTS

| | | | |
|---|---|---|---|
| 2,602,887 | 7/1952 | Brown | 325—128 |
| 2,614,246 | 10/1952 | Dome | 325—156 |
| 2,951,996 | 9/1960 | Pan | 333—11 |
| 3,271,683 | 9/1966 | Sosin | 325—156 |
| 3,346,823 | 10/1967 | Maurer et al. | 333—11 |
| 3,385,974 | 5/1968 | Rockwell | 343—208 |

RICHARD MURRAY, Primary Examiner

J. A. BRODSKY, Assistant Examiner

U.S. Cl. X.R.

325—156, 158, 178; 333—11